United States Patent [19]
Kasihara

[11] Patent Number: 5,587,838
[45] Date of Patent: Dec. 24, 1996

[54] PROJECTION LENS UNIT

[75] Inventor: Takasi Kasihara, Nara, Japan

[73] Assignee: Matsushita Electric Industrial Co., Ltd., Osaka, Japan

[21] Appl. No.: 606,866

[22] Filed: Feb. 26, 1996

Related U.S. Application Data

[63] Continuation of Ser. No. 212,905, Mar. 15, 1994, abandoned.

[30] Foreign Application Priority Data

Mar. 16, 1993 [JP] Japan .................... 5-054541

[51] Int. Cl.⁶ .................................. G02B 3/00
[52] U.S. Cl. .................... 359/649; 359/648; 359/650; 359/665
[58] Field of Search .................... 359/642, 648, 359/650, 665

[56] References Cited

U.S. PATENT DOCUMENTS

5,157,554  10/1992  Kasihara .................... 359/649

*Primary Examiner*—David C. Nelms
*Assistant Examiner*—F. Niranjan
*Attorney, Agent, or Firm*—McDermott, Will & Emery

[57] ABSTRACT

A projection lens unit using the principles of liquid-cooled, optical coupling is disclosed. In particular, the present invention automatically re-focusses a lens unit that is being exposed to high temperature operating conditions. The temperature rise of the optical coupling liquid changes the refractive index of the liquid, thereby changing the focussing distance of the projection lens. As a result, the picture projected onto the screen becomes unfocussed. The present invention provides a countermeasure for automatically re-focussing the picture projected on the screen. An optical coupling lens, which is one of the lens element group of the projection lens, is movably coupled to an OC housing to move along the optical axis. The volume expansion caused by the temperature rise of the optical coupling liquid is converted to a pressure change. The pressure change is used for controlling the movement of the optical coupling lens. The focussing distance of the projection lens is automatically compensated for according to the temperature rise of the optical coupling liquid.

10 Claims, 8 Drawing Sheets

AIR CHAMBER = 60cc

FIG. 5

FIG. 6   AIR CHAMBER = 60cc

FIG. 7   AIR CHAMBER = 30cc

FIG. 8   AIR CHAMBER = 30cc

PROJECTION LENS UNIT

This application is a continuation of application Ser. No. 08/212,905, filed Mar. 15, 1994.

BACKGROUND OF THE INVENTION

1. Field of the Invention

The present invention relates to a projection lens unit. More particularly, it relates to a method and device for maintaining the proper focus of a projection lens unit in relatively high temperature operating conditions.

2. Description of the Art

Figure 2:
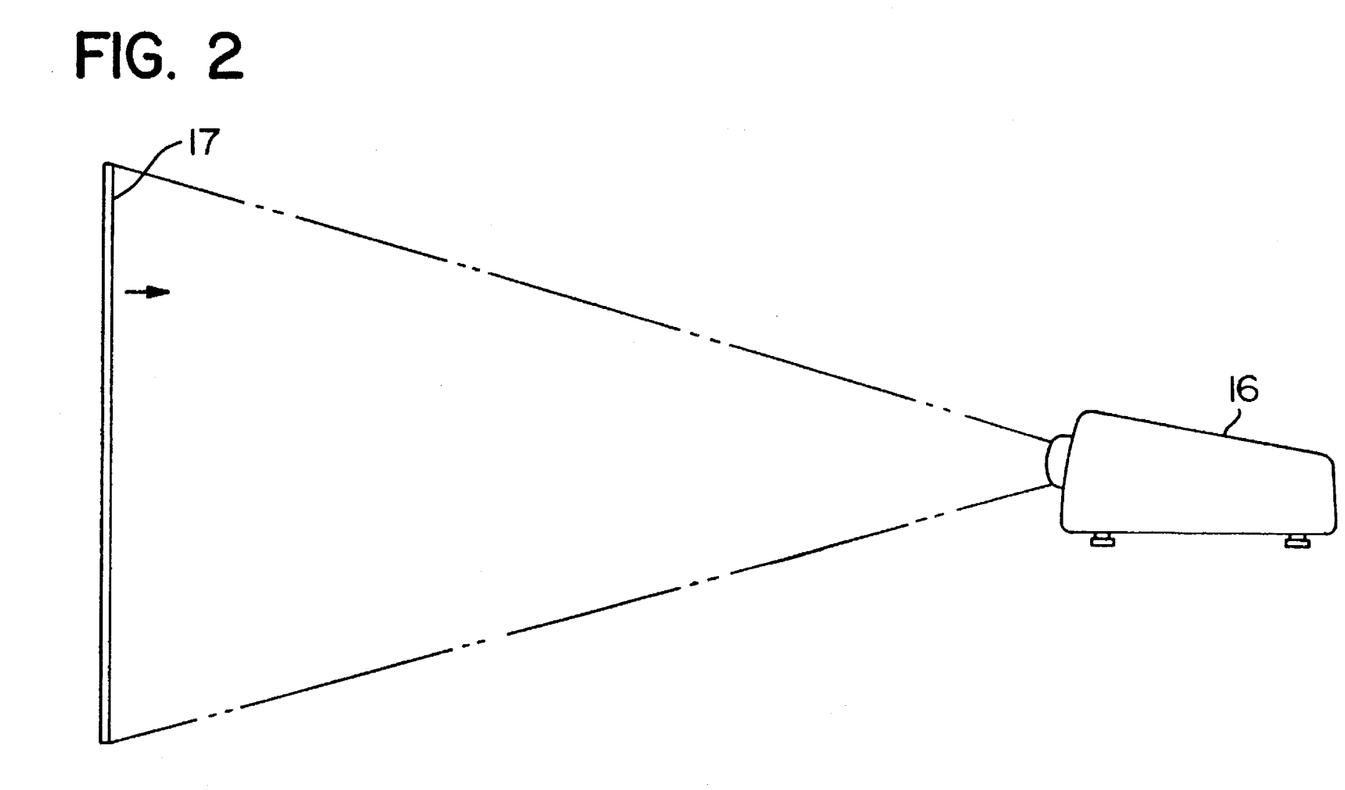
FIG. 2 illustrates a picture being projected onto a screen in front of the video projector.

Projection television systems are well known. In general, such a system takes a picture from a relatively small CRT (cathode ray tube) screen and projects and magnifies it through a projection lens onto a larger screen. FIG. 2 illustrates a projection system in which a picture is projected from a video projector 16 onto a screen 17 placed a predetermined distance in front of the projector 16.

Optical coupling is a technique used in projection systems to improve the clearness and contrast of the projected image. In optical coupling, a filling liquid is placed in the optical path of the CRT's faceplate. The filling liquid is one that is highly transparent and has approximately the same refractive index as the faceplate. In general, the filling liquid decreases interfacial reflection by reflecting undesired light.

Figure 1:
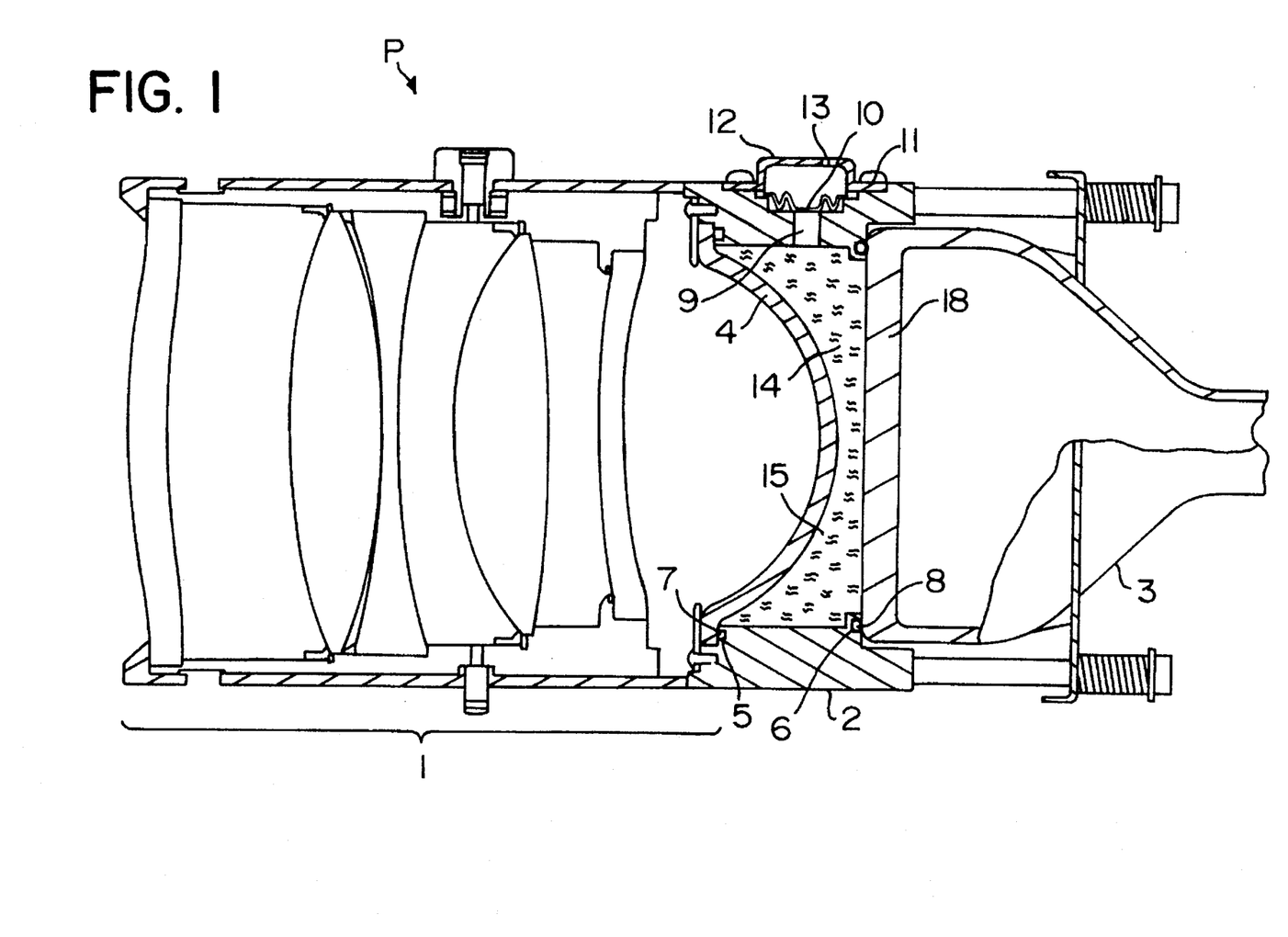
FIG. 1 shows an axial cross-sectional view of a projection lens unit in accordance with the prior art.

FIG. 1 illustrates an axial cross section of a known projection lens unit P. The unit P includes a CRT 3 mounted on a right side of an "optical coupling" (OC) housing 2. An OC lens 4 is mounted on a left side of the OC housing 2. The OC lens 4 is located to the right of a projection lens 1.

The OC housing 2 includes gutters 5 and 6. Sealing rubbers 7 and 8 are inserted in the gutters 5 and 6, respectively. The OC lens 4 is mounted on a left side of the OC housing 2, and the CRT 3 is mounted on a right side of the OC housing 2. The sealing rubbers 7 and 8 are tightly pressed to a CRT faceplate 18 to form a liquid tight seal.

The OC housing 2 includes a pressure adjusting hole 9. A pressure loosening diaphragm 10, made of elastic material such as rubber, is mounted over the pressure adjusting hole 9. The pressure loosening diaphragm 10 has around its rim a pressure sealing part 11, which is seated in a sealing gutter formed around the pressure adjusting aperture 9. A holding cover 12 is mounted over the pressure adjusting hole 9 and diaphragm 10. The holding cover 12 presses the pressure sealing part 11 against the OC housing 2, thereby providing a liquid tight seal over the hole 9. This liquid tight seal also seals an OC chamber 14 formed by the OC housing 2, the CRT 3, and the OC lens 4. The holding cover 12 includes a ventilation hole 13 which exhausts air when the pressure loosening diaphragm 10 moves upward.

Referring still to FIG. 1, prior to sealing the cover 12 in place, the OC chamber 14 is filled with an OC liquid 15 through the pressure adjusting aperture 9. Suitable OC liquids 15 include ethylene glycol, ethylene glycol mixed with a small amount of pure water, ethylene glycol mixed with glycerin, and ethylene glycol mixed with glycerin and a small amount of pure water.

When the CRT 3 is turned on, the picture displayed on the CRT screen is projected and magnified by the projection lens 1 onto a screen 17 located in front of the video projector 16 as shown in FIG. 2. The components of the projection system must be precisely aligned so that the image projected onto the large screen 17 remains focussed.

One of the problems with optical coupling projection systems is that high temperature operating conditions can cause the projected picture to become unfocussed. This is because heat changes the refractive index of the liquid, thereby changing the focus of the projected image.

Because the CRT of a video projector requires a large amount of light in order to perform the required magnification and projection, video projectors are driven with a large amount of electric power compared with the power requirements of an ordinary CRT being used for direct viewing. Therefore, the temperature of the CRT itself, particularly its faceplate, can rise over 100° C. during use.

The OC liquid 15 functions as a cooling liquid for lowering the temperature of the faceplate 18. Heat is transmitted to the OC housing 2 through the OC liquid 15 and dissipated into the air. Increased temperature causes the OC liquid 15 to expand, thereby pushing upwards on the pressure loosening diaphragm 10. Increased temperature also decreases the refractive index of the OC liquid 15 in proportion to the amount of volume expansion. In the case of ethylene glycol, for example, the refractive index of E-ray (545 nano meter) is 1.4308 at 20° C. and 1.4146 at 70° C. The OC liquid temperature gradually rises while the CRT 3 is being operated, and, in a typical video projector, the liquid temperature can reach as high as 70° C. to 80° C. Noticeable defocussing occurs when the OC liquid 15 reaches about 20° C.

Accordingly, there is a need for a projection lens unit that takes advantage of the benefits of an OC system but avoids the drawbacks associated with the defocussing that occurs at high temperatures. To date, no positive countermeasures have been taken against the drawbacks described above.

SUMMARY OF THE INVENTION

Thus, it is an object of the present invention to provide a projection lens unit capable of automatically maintaining focus under a variety of operating conditions.

It is another object of the present invention to provide a projection lens unit capable of automatically maintaining focus under high temperature operating conditions.

It is also an object of the present invention to provide an inexpensive and simple method of automatically maintaining the focus of a liquid-cooled, optically coupled projection lens unit in high temperature operating conditions.

These and other objects are achieved under present invention by providing a projection lens unit including a housing having a chamber containing a liquid. A lens is movably coupled to the housing, and the liquid is coupled to the movable lens such that expansion of the liquid moves the lens.

In another embodiment of the invention, the projection unit includes a display device on which a picture is displayed; a projection lens for projecting the picture onto a screen; an optical coupling housing, having the display device mounted at one side, and having the projection lens mounted at another side; an optical coupling lens adjacent to the optical coupling housing and liquid-tightly mounted to the optical coupling housing with an adhesive material having rubbery elasticity; the display device being liquid-tightly mounted to the optical coupling housing; and an optical coupling chamber defined by a space between the optical coupling housing, the optical coupling lens, and the display device.

The OC lens of the present invention is adhered to an OC housing with elastic adhesive material such as silicone rubber. When pressure is applied to the OC lens, the rubber adhesive layer elastically deforms, thus allowing the OC lens to move on the optical axis. The OC lens is sealed to the OC housing in a liquid-tight manner. The elastic resettability force characteristic of the rubber adhesive layer is designed with a predetermined adhesive material, thickness of the adhesive layer, and adhesive length, among others, and is mounted so that desired elastic resettability force characteristic and desired durability are obtained.

Thus, it can be seen that the present invention achieves several advantages. The present invention compensates for picture defocussing caused by a drift of the focussing distance of the projection lens due to the temperature rise caused by CRT operating conditions. The compensation is made by automatically moving the OC lens, not with a complex mechanism such as measuring equipment or an electric circuit, but by taking advantage of the liquid volume expansion that accompanies an increase in OC liquid temperature. The present invention presents a simple, inexpensive, and highly reliable projection lens unit having a focus compensation function.

DESCRIPTION OF THE PREFERRED EMBODIMENTS

Figure 3:
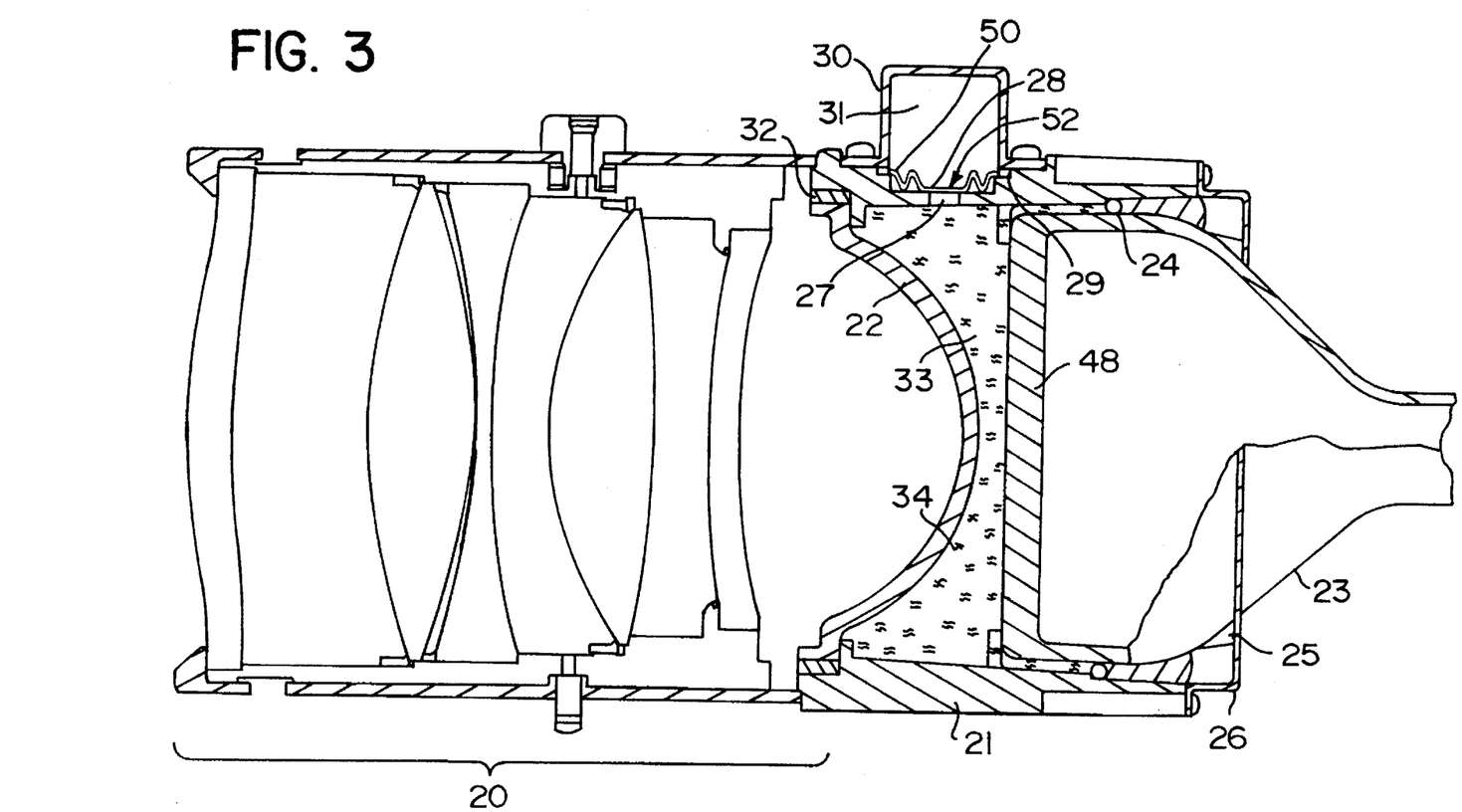
FIG. 3 shows an axial cross-sectional view of a projection lens unit in accordance with a preferred embodiment of the present invention.

FIG. 3 is an axial cross-sectional view of a projection lens unit made in accordance with the present invention. As shown in FIG. 3, an OC lens 22 is liquid-tightly adhered to a left side of an OC housing 21 using a rubbery and relatively thick adhesive layer 32 uniformly formed around the periphery of the OC lens 22. A CRT 23 is mounted coaxially to a right side of the OC housing 21. An O-ring 24, having a cross-section that is somewhat larger than a gap between the inner wall of the OC housing 21 and the outer surface of the CRT 23, is pushed into the gap so that the CRT 23 will remain fixed and not move eccentrically. An adhesive, such as silicone rubber, is filled into the above-mentioned gap, thus creating a liquid-tight seal.

OC liquid 34 is poured and filled into a liquid-tight OC chamber 33, which is surrounded by the OC housing 21, the OC lens 22 and the CRT 23.

Because the OC lens 22 is attached by elastically deformable rubbery adhesive material, when the internal pressure of the OC chamber 33 increases, the OC lens 22 moves in the direction indicated by the broken lines shown in FIG. 3. The amount of movement is proportional to the internal pressure of the OC chamber 33, and, when this pressure vanishes, the OC lens 22 returns to its original position. A plurality of saddle parts 25 are formed on a cone portion of the CRT 23. The saddle parts 25 hit against a holding plate 26 such that the CRT 23 does not move, even when the internal pressure of the OC chamber 33 increases.

A pressure adjusting aperture 27, which functions also as an access point for pouring the OC liquid 34 into the OC chamber 33, is provided on an upper side of the OC housing 21. The pressure adjusting aperture 27 is covered by a movable diaphragm 28 made of elastic material such as rubber. A brim portion 50 of the movable diaphragm 28 is pressed against the housing 21 by a pressure sealing part 29, thereby fixing the movable diaphragm 28 within a sealing gutter 52 formed in the housing 21 around the pressure adjusting aperture 27. An air tank 30 is secured over the movable diaphragm 28 and tightly against the pressure sealing part 29, thereby sealing the OC liquid 34 within the OC chamber 33 in a liquid-tight manner. At the same time, the air tank 30 seals air inside the air tank 30 in an air-tight manner. The air tank 30 is designed so that it forms an internal chamber 31 having a predetermined volume. The movable diaphragm 28 moves up or down in response to an expansion in the volume of the OC liquid 34.

The performance of the projection lens unit in accordance with a preferred embodiment of the present invention will now be explained.

At the initial setting of the video projector 16, the lens focus is adjusted by the user so that a clear and focussed picture is projected onto the screen 17. After a period of use, the CRT 23 dissipates a considerable amount of heat to the OC liquid 34 through the faceplate 48, thereby increasing the temperature of the OC liquid 34. The increased temperature not only expands the OC liquid's volume but also decreases its refractive index in proportion to the amount of the liquid temperature rise. The decreased refractive index of the OC liquid causes the optimum focussing plane to gradually move from the screen 17 towards the video projector 16. As a result, the picture on the screen 17 becomes unfocused and unclear.

The present invention solves this problem by maintaining the projection lens focussing point independently of the OC liquid temperature. In the first preferred embodiment, the volume expansion of the OC liquid 34 due to the liquid temperature rise is converted to a pressure change, and the OC lens 22 is allowed to move a predetermined amount in response to this pressure change. The predetermined amount of movement of the OC lens 22 is chosen such that the projection lens focussing point remains the same.

Figure 4:
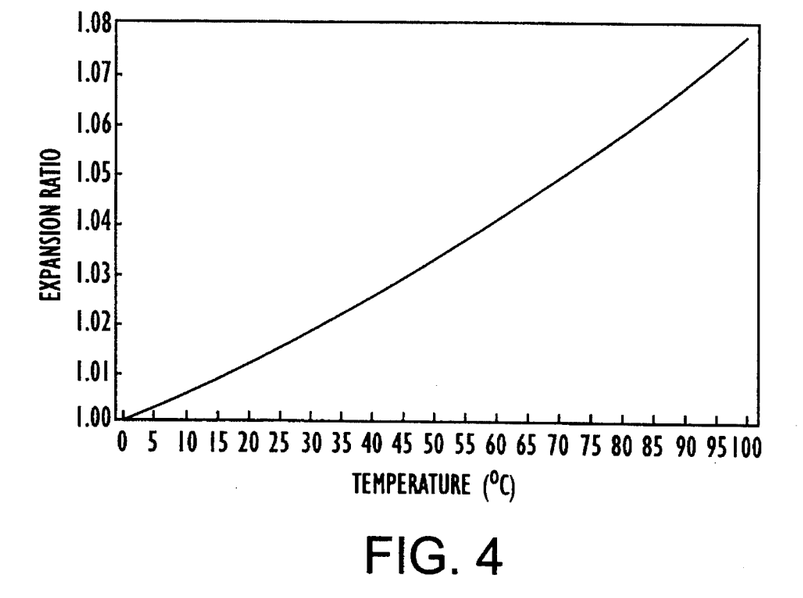
FIG. 4 illustrates a volume expansion characteristic of the OC liquid in the projection lens unit in accordance with a preferred embodiment of the present invention.

FIG. 4 is a graph illustrating the relationship between the volume ratio of the OC liquid 34 and the temperature of the OC liquid 34, wherein the OC liquid 34 is ethylene glycol, and the volume ratio is expressed in relation to the volume at a liquid temperature of 0° C. As shown in FIG. 4, the expansion characteristic of the OC liquid 34 is nearly linear.

The OC liquid 34 occupies nearly all of the OC chamber 33. Accordingly, when the OC liquid 34 expands, the movable diaphragm 28 is gradually pushed up. Because the air chamber 31 is tightly sealed, the air in the chamber 31 is compressed, and the air pressure in the chamber 31 increases. Because the expansion characteristic of the OC liquid 34 is nearly linear, as shown in FIG. 4, the air pressure in the chamber 31 rises nearly linearly with the liquid temperature change.

If the OC lens 22 were rigidly fixed to the OC housing 21 with a non-movable structure, virtually all of the OC liquid's expansion would be absorbed by the upward movement of the movable diaphragm 28. Assuming that the OC chamber 33 is filled with approximately 500 cc of the OC liquid 34, the OC liquid 34 expands by about 18.5 cc with a liquid temperature increase from 20° C. to 70° C. Accordingly, the air in the air chamber 31 is compressed by an amount proportional to the OC liquid's volume increase. The precise amount of pressure increase within the chamber 31 depends on the volume of the chamber 31.

However, if the OC lens 22 is provided with a movable connection to the OC housing 21, as shown in FIG. 3, the OC liquid's expansion is absorbed through upward movement of the movable diaphragm 28 and through movement of the OC lens 22.

The following equations set forth the relationship between 1) the elastic resettability force of the adhesive layer 32 against the movement of the OC lens 22, 2) the pressure against the OC lens 22 due to the internal pressure of the OC chamber 33, and 3) the internal pressure of the air chamber 31.

---

(pressure inside the air chamber 31) =
(pressure inside the OC chamber 33)
and
(the pressure against the OC lens 22 due to the
pressure inside chamber 33) =
(the elastic resettability force of the
adhesive layer 32 against the movement of the OC lens 22)

---

In other words, the movement of the OC lens 22 is controlled by pressure inside the air chamber 31 through the OC liquid 34.

For a given application of the present invention, the amount of movement required for the OC lens 22 will depend on the characteristics of the particular projection lens. However, it is possible to determine the required amount of movement through an optical simulation of the projection lens 20.

In the projection lens 20 shown in FIG. 3, the OC lens 22 must be capable of moving about 0.5 mm in order to accommodate a liquid temperature change in the range from about 20° C.–70° C. The required elastic resettability characteristic of the adhesive layer 32 is now determined based on the air volume in the air tank 30 and the liquid volume of the OC liquid 34.

In implementing the disclosed embodiments of the present invention, in order to obtain an optimum design, it is necessary to factor in the following considerations.

1. As the OC housing 21 expands in response to the temperature rise of the OC liquid 34, the volume of the OC chamber 33 increases also. How much it increases differs somewhat depending on the shape, material, and structure of the OC housing 21. Therefore, it is important to experiment with an actual projection unit before finalizing values for the variables discussed herein.

2. The expansion of the OC liquid 34 is absorbed by the movement of the OC lens 22, the movement of the movable diaphragm 28, and the expansion of the OC housing 21. The expansion of the OC housing 21, i.e. the volume increment of the OC chamber 33, is a definite value determined by the material of the OC housing 21. The value that the OC lens 22 is to move must be a value to compensate the variation of the refractive index of the OC liquid 34. Accordingly, most of the expansion increment of the OC liquid 34 must be absorbed by the movement of the movable diaphragm 28.

3. The movement amount of the OC lens 22 is determined by a correlation between the elastic resettability force of the adhesive layer 32 and the pressure applied to the OC lens 22. The source of the pressure applied to the OC lens 22 is the internal pressure of the air chamber 31, and the internal pressure of the air chamber 31 is mainly caused by the fact that the air in the air chamber 31 is compressed due to the volume expansion of the OC liquid 34. Therefore, it is important to determine the air volume in the air tank 30.

4. Because high temperature operating conditions will also cause the air temperature in the air chamber 31 to also rise and expand somewhat, it is necessary to consider this fact in addition to the internal pressure rise in the OC chamber 33. It is presumed that the temperature of the air becomes a little higher than that in the video projector.

The following describes an example of a design that was actually created using optical simulation and considering the factors set forth above. In this example, the elastic resettability force characteristic of the adhesive layer 32, the volume increment of the OC chamber 33 due to the temperature rise of the OC housing 21, and the quantity of the OC liquid 34 filled at a normal temperature, were all measured in the course of making an actual projector embodying the present invention.

The elastic resettability force characteristic of the adhesive layer 32 is expressed as an amount of pressure required to move the OC lens 22 by a unit length when pressure is applied inside the OC chamber 33 after the OC lens 22 has been adhered to the OC housing 21 in the manner shown in FIG. 3. For example, 2 kg/cm$^2$/cm means that a pressure of 2 kg/cm$^2$ is required to move the OC lens 22 by 1 cm.

Preferably, a computer program is used to simulate the conditions and factors discussed above. A suitable program is a commercially available and sold under the tradename "OPTEDGE" by the Minolta Camera Company.

Figure 11:
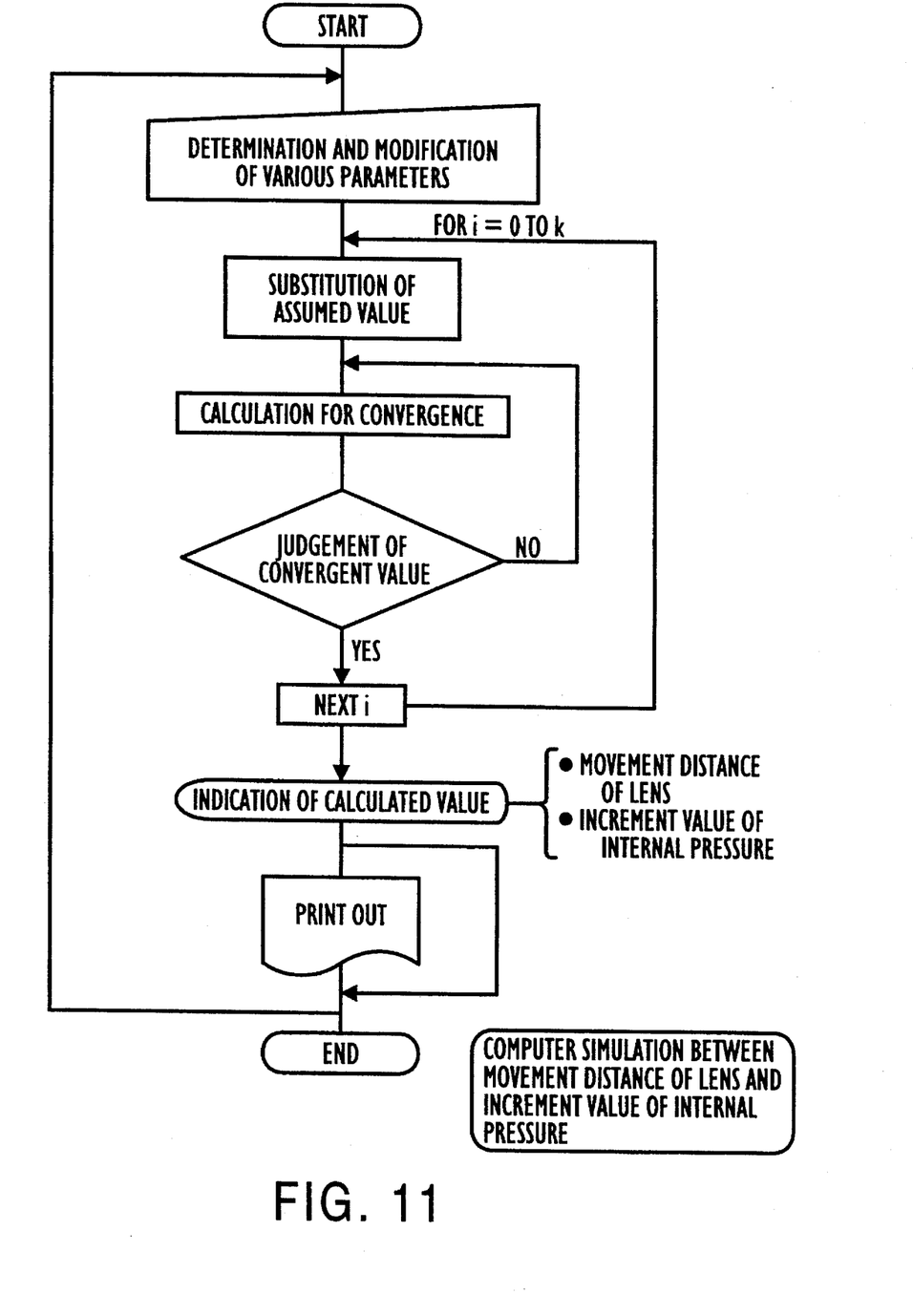
FIG. 11 shows a flow chart of a computer program suitable for testing the results of changing certain variables related to the projection lens unit of the present invention.

In the present example, a specially designed computer program was also used to simulate the projection lens and unit being designed. FIG. 11 shows a flow chart of a computer program suitable for testing the results of changing certain variables related to the projection lens unit of the present invention. First, the various parameters are determined and then values are then input for these parameters. When all of the parameters (k) have been determined, the computer then calculates the convergence values of the convergence parameters based on the input values. For the present invention, the convergence parameters are 1) movement distance of the lens, and 2) incremental value of the internal pressure. The user chooses whether to print the results, and then the program is either ended or returned to start.

Some of the conditions and the factors that were computer simulated included the following.

1. Liquid temperature change ... from 20° C. (the initial) to 70° C. (after the temperature has risen).
2. Movement distance of the OC lens 22 ... 0.5 mm for the temperature change mentioned above.
3. Quantity of the OC liquid 34 ... 500 cc.
4. Expansion rate of the OC liquid 34 ... the data shown in FIG. 4.
5. Elastic resettability force of the adhesive layer 32 ... 3 kg/cm$^2$/cm.
6. volume of the air chamber 31 ... 60 cc.
7. pressured area of the OC lens 22 ... 154 cm$^2$.

Figure 5:
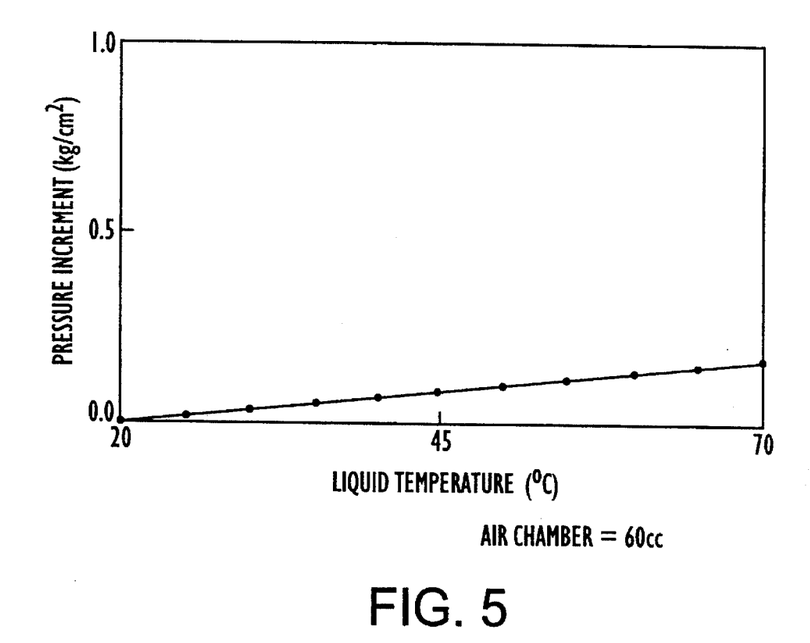
FIG. 5 illustrates a characteristic of the increment of the internal pressure in the OC chamber with the OC liquid temperature in the projection lens unit in accordance with a preferred embodiment of the present invention (an example in which the air chamber volume is 60 cc)

FIG. 5 is a graph showing the pressure variation of the OC chamber 33 (the change of internal pressure in the air chamber 31) plotted against the OC liquid 34 temperature for the above-described computer simulation. It should be noted that the internal pressure in the OC chamber 33 increased almost linearly with respect to the temperature rise of the OC liquid 34.

Figure 6:
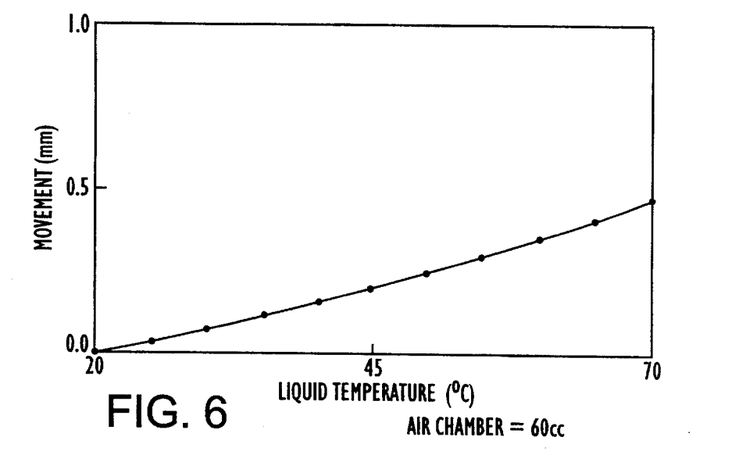
FIG. 6 illustrates a characteristic of the movement of the OC lens with the OC liquid temperature in the projection lens unit in accordance with a preferred embodiment of the present invention (an example in which the air chamber volume is 60 cc)

FIG. 6 is a graph showing the movement distance of the OC lens 22 plotted against the OC liquid 34 temperature. The movement distance also increased approximately linearly with respect to the temperature rise of the OC liquid 34. The total movement distance of the OC lens 22, 0.5 mm, as a requisite condition to compensate defocussing, is obtained at the OC liquid temperature of around 70° C.

Figure 7:
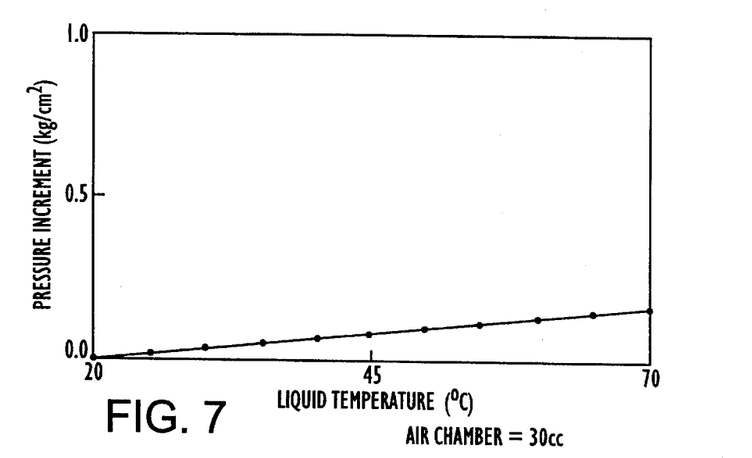
FIG. 7 illustrates a characteristic of the increment of the internal pressure in the OC chamber with the OC liquid temperature in the projection lens unit in accordance with a preferred embodiment of the present invention (an example in which the air chamber volume is 30 cc)
Figure 8:
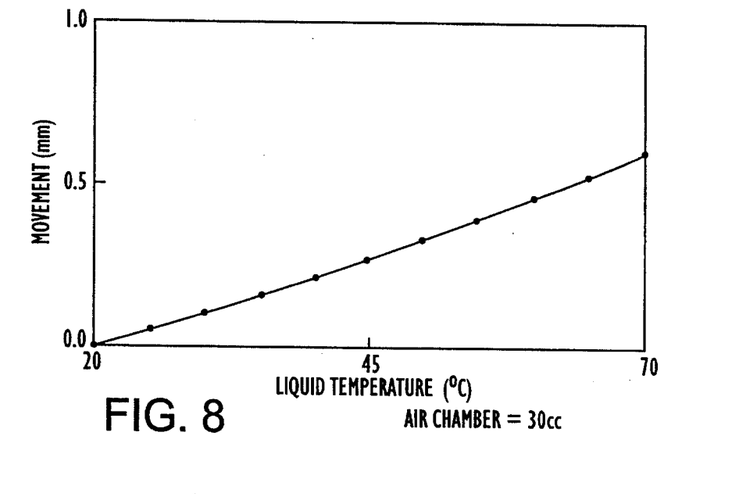
FIG. 8 illustrates a characteristic of the movement of the OC lens with the OC liquid temperature in the projection lens unit in accordance with a preferred embodiment of the present invention (an example in which the air chamber volume is 30 cc)

FIGS. 7 is a graph showing the incremental increase of the internal pressure of the OC chamber 33 plotted against the OC liquid 34 temperature. FIG. 8 is a graph showing the movement distance of the OC lens 22 plotted against the OC liquid 34 temperature. FIGS. 7 and 8 represent the same operating conditions described above except the volume of the air chamber 31 is changed to 30 cc. The compressibility of the air in the air chamber 31 increases and the internal pressure increment is larger because there is less air in the air chamber 31. Accordingly, the movement distance of the OC lens 22 also increases.

If the characteristics of the projection lens 20 (CRT screen size, focus length, etc.) are determined, the OC lens size is almost determined, and the elastic resettability force characteristic of the adhesive layer 32 formed in its periphery cannot have a very wide range of movement distances. Therefore, it is expected that the widest design latitude will come from the chosen internal pressure increasing characteristic of the OC chamber 33. In particular, the widest design latitude will be in choosing the volume of the air chamber 31.

It may also be convenient to adjust the internal pressure increasing characteristic precisely by making the actual volume of the air chamber 31 of the air tank 30 a little larger than the value obtained with the simulation. This may be accomplished by adding a small volume adjusting device, such as a plastic ball or a plastic cube, to more precisely adjust the air volume of the air chamber 31.

Figure 9:
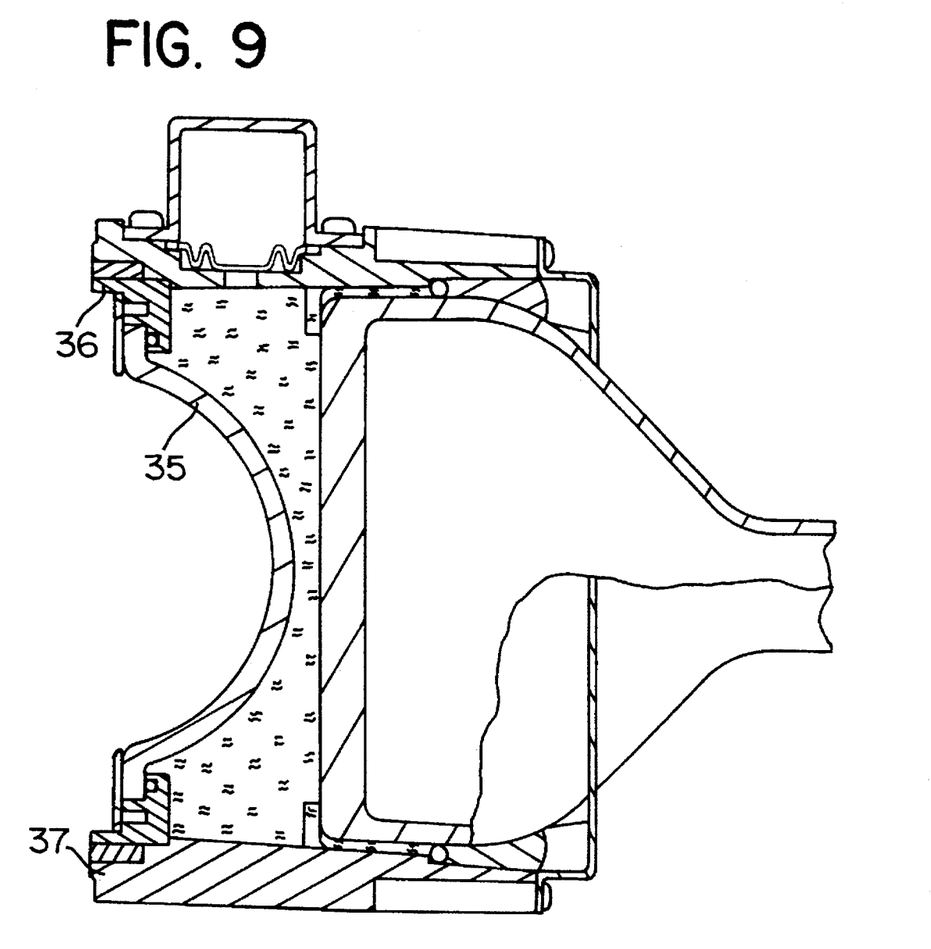
FIG. 9 shows an axial cross-sectional view of a projection lens unit (excluding a lens element group) in accordance with another preferred embodiment of the present invention.

Some projection lens' have a small diameter OC lens. In this case, because the pressured area of the OC lens 22 is small, the pressure force on the OC lens 22 can sometimes be insufficient. This problem is addressed by the embodiment shown in FIG. 9. This embodiment provides an OC lens 35 that is liquid-tightly mounted to an attachment ring 36, and the attachment ring 36 is adhered to an OC housing 37 in a similar fashion as the OC lens 22 shown in FIG. 3. Thus, the pressured area of the OC lens 35 can be somewhat freely adjusted, even in an OC lens having a small diameter.

Figure 10:
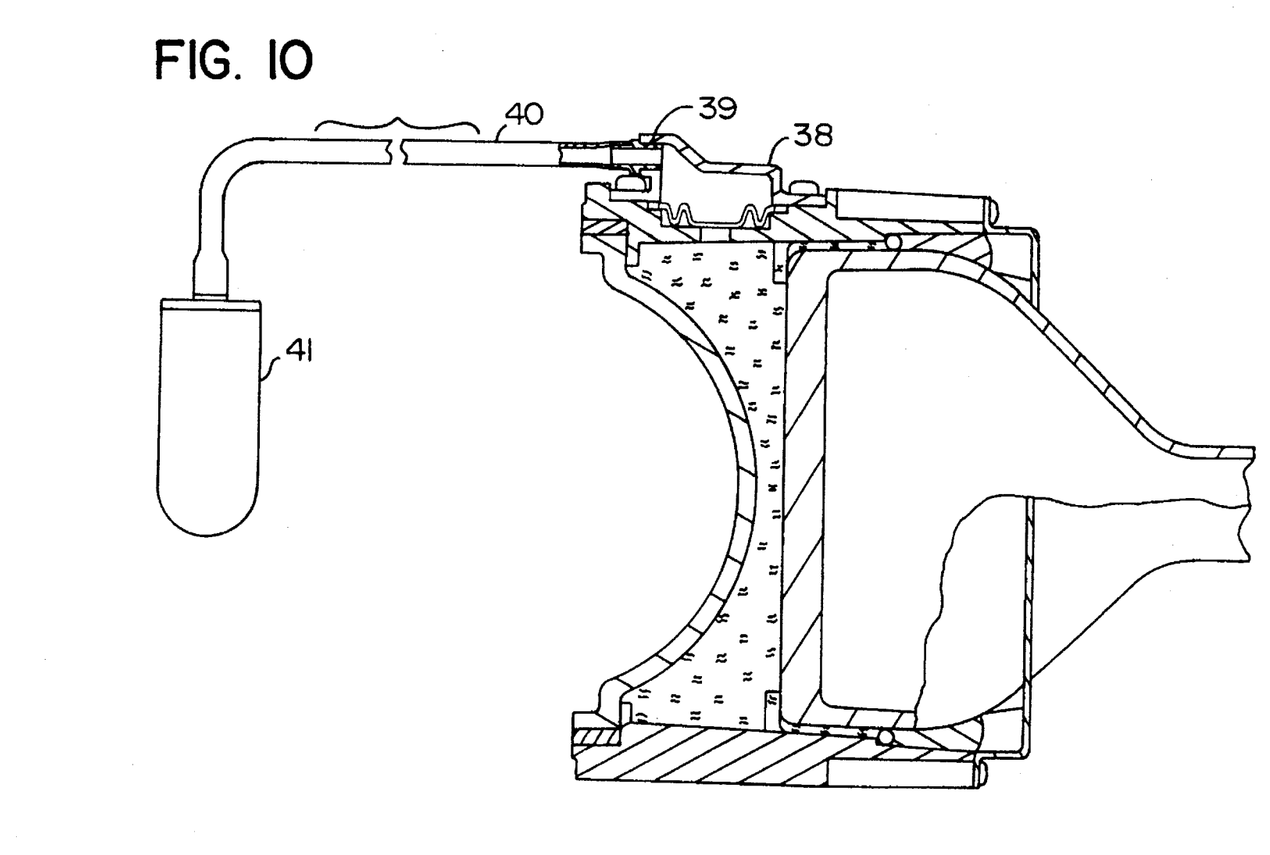
FIG. 10 shows an axial cross-sectional view of a projection lens unit (excluding a lens element group) in accordance with still another preferred embodiment of the present invention (the case in which the air tank is separated from the OC housing)

There may also be a situation in which the air tank cannot be directly mounted to the OC housing because of the structure of the projector or for some other reason. Another embodiment, shown in FIG. 10, is provided for combating this problem. As shown in FIG. 10, a tubular coupler 39 is inserted into a movable diaphragm cover 38, and the air chamber above the diaphragm is connected to an air tank 41 which is separately mounted from the diaphragm through a flexible tube 40. The air volume in the flexible tube 40 also functions as part of the air tank volume.

Accordingly, in view of the above-described embodiments, it can be seen that the present invention achieves several advantages. The present invention compensates for picture defocussing caused by a drift of the focussing distance of the projection lens due to the temperature rise caused by CRT operating conditions. The compensation is made by automatically moving the OC lens, not with a complex mechanism such as measuring equipment or an electric circuit, but by taking advantage of the liquid volume expansion that accompanies an increase in the temperature of the OC liquid. The present invention presents a simple, inexpensive, and highly reliable projection lens unit having a focus compensation feature.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description. All changes which come within the meaning and range of equivalency of the appended claims are therefore intended to be embraced therein.

I claim:

1. An optical coupling arrangement for a display device comprising:

a display device for displaying a picture;

an optical coupling housing mounted to said display device, said optical coupling housing having an aperture therein covered by a movable diaphram;

an optical coupling lens mounted to said optical coupling housing with elastically deformable material;

a liquid-tight optical coupling chamber defined by said display device, said optical coupling housing and said optical coupling lens, said optical coupling chamber filled with optical cooling liquid; and an air tank filled with air mounted in an air-tight manner to said optical coupling housing over said movable diaphragm, wherein said movable diaphragm moves according to pressure changes in said liquid-tight optical coupling chamber and said air absorbs said pressure changes.

2. The optical coupling arrangement according to claim 1, wherein said elastically deformable material includes a silicon rubber adhesive.

3. The optical coupling arrangement according to claim 1, wherein said optical coupling housing and said display device are circular, said optical coupling housing having an inner portion with a larger diameter than a diameter of an outer portion of said display device, with said display device being coaxially mounted to said optical coupling housing with an O-ring fitted between said display device and said optical coupling housing.

4. The optical coupling arrangement according to claim 1, wherein said optical cooling liquid is highly transparent.ethylene glycol.

5. The optical coupling arrangement according to claim 4, wherein said optical cooling liquid is ethylene glycol.

6. The optical coupling arrangement according to claim 1, wherein said air tank includes a plastic ball inside of said air tank to adjust the volume of said air inside said air tank.

7. The optical coupling arrangement according to claim 1, wherein said air tank includes a plastic ball inside of said air tank to adjust the volume of said air inside said air tank.

8. The optical coupling arrangement according to claim 1, wherein said air tank includes a plastic cube inside of said air tank to adjust the volume of said air inside said air tank.

9. The optical coupling arrangement according to claim 1, further comprising:

a source of air coupled to said air tank by a flexible tube.

10. The optical coupling arrangement according to claim 1, further comprising:

a saddle part formed on a cone portion of said display device to prevent said display device from moving due to pressure changes in said liquid-tight optical coupling chamber.

* * * * *